July 14, 1942.  W. B. JOHNSON  2,289,366
CRANE FOR ATTACHMENT TO MOTOR VEHICLES
Filed Oct. 8, 1941  2 Sheets-Sheet 1
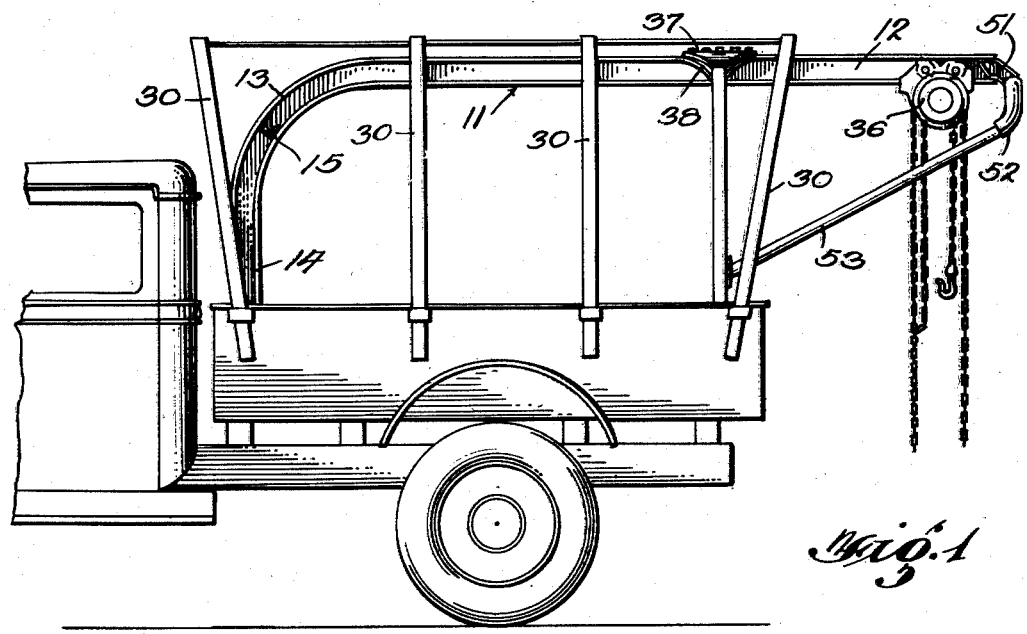
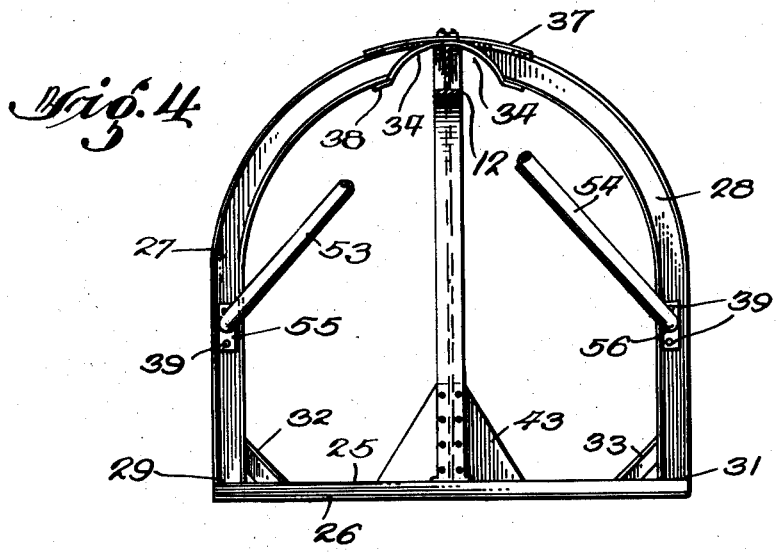
INVENTOR.
William B. Johnson

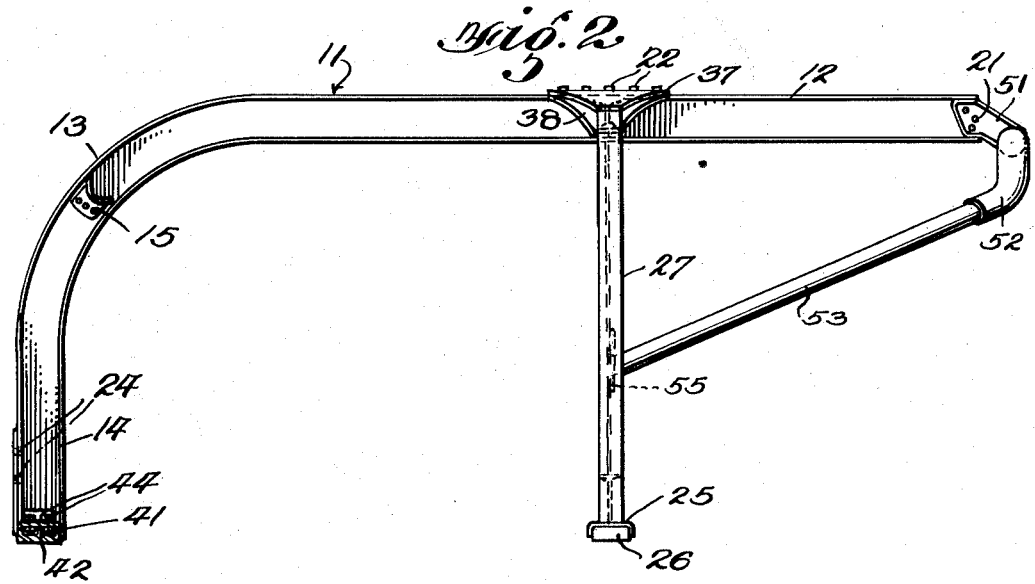
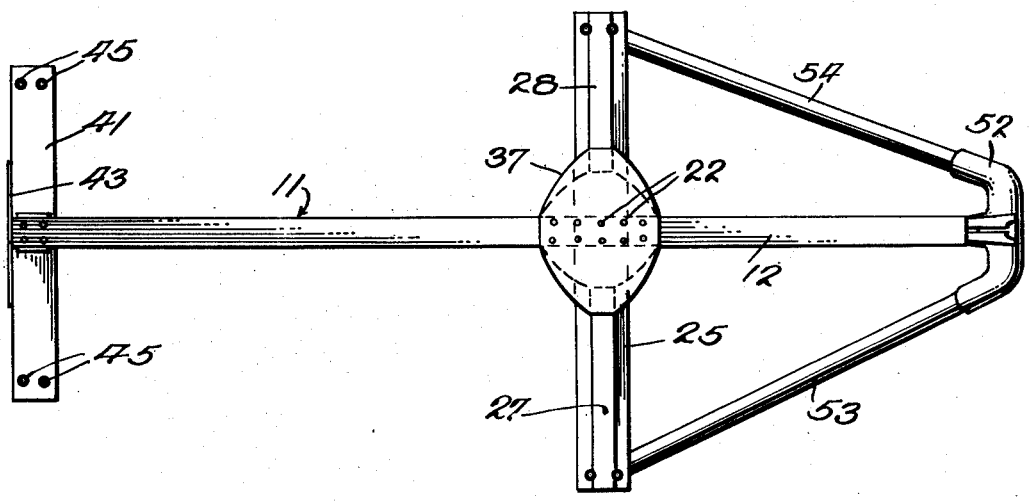

Patented July 14, 1942

2,289,366

UNITED STATES PATENT OFFICE 2,289,366

CRANE FOR ATTACHMENT TO MOTOR VEHICLES

William B. Johnson, United States Army

Application October 8, 1941, Serial No. 414,136

10 Claims. (Cl. 214—65)

(Granted under the act of March 3, 1883, as amended April 30, 1928; 370 O. G. 757)

The invention described herein, if patented may be manufactured and used by or for the Government for governmental purposes without the payment of any royalty thereon.

The present invention relates to cranes and more particularly to a crane arranged for attachment to a motor vehicle, whereby a standard type of cargo truck may be easily converted into a wrecking car.

The device disclosed here has been developed in the United States Army to meet present military requirements, but while it is particularly applicable to converting a standard Army truck into a wrecking car, its use is not limited thereto. The principles of this disclosure are believed to be equally applicable in any instance requiring a conversion unit arranged to convert a truck into a wrecking car without any permanent alterations, so that when it has served its purpose it may be easily and simply reconverted into a standard cargo truck.

One of the principal objects of the invention is to provide, as an independent article of manufacture, a prefabricated sectional crane adapted to be installed in any standard type of motor truck body.

Another object of the invention is to provide a prefabricated sectional crane composed of a number of separate sections, the several sections being drilled and fitted in matching relationship with each other, whereby the individual sections of the crane may be separately shipped, but may be assembled and installed in a truck body without sacrificing the strength inherent in an integrally welded frame structure.

A further object of the invention is to provide a crane having a chain hoist arranged to slide longitudinally on a vertical crane track beam extending outwardly beyond the rear of a truck body and having gravity means for maintaining the chain hoist against shifting movement when not in use.

A further object of the invention is to provide a sectional crane frame structure adapted to support a chain hoist mounted on a horizontal, longitudinal track beam, the arrangement being such that the track supporting structure does not extend appreciably above the upper extremity of the track beam, to the end that the crane assembly may be installed below the cross bows of a standard military motor vehicle without sacrificing desirable height of the longitudinal track beam or increasing the silhouette of the vehicle.

These and other important objects are accomplished in the present invention by providing a crane frame composed of four prefabricated sections, each of which is built up of a number of pieces welded into integral relationship with each other, and is drilled and fitted to facilitate quick and easy assembly in the field without the use of any special machinery or tools. The construction and arrangement is such that the strains imposed on the frame are borne largely by the integrally welded joints and, where such strains are of necessity borne by the bolts provided in the field they are so distributed that an adequate margin of safety is allowed.

Referring now more particularly to the drawings:

Fig. 1 is a side elevational view of a preferred embodiment of this disclosure, shown installed in a standard form of Army motor truck.

Fig. 2 is a side elevational view of a crane frame structure disclosed in Fig. 1.

Fig. 3 is a plan view of the crane frame, and

Fig. 4 is an end elevational view, partly in section.

In the preferred embodiment illustrated in the drawings, the crane frame comprises four prefabricated sections, namely, a longitudinal track beam assembly, an arch frame assembly, a front anchor assembly, and a track beam brace. Each of these consists of a number of separate parts that are welded or otherwise permanently united with each other in the process of fabrication and are drilled with matching bolt holes so that they may be shipped "knocked down" to the point of destination and may be quickly and easily bolted together in the field to form the complete crane superstructure.

The track beam assembly comprises a single large I-beam 11, having a relatively long, straight portion 12 which in the final assembly will be positioned in horizontal position and arranged to extend outwardly over the rear edge of the truck body, a downwardly curved front section 13, and a relatively short, vertical anchor section 14, extending downwardly to the anchor assembly, to be hereinafter described. The entire I-beam assembly will be seen to be in a single integral piece, the radius of the curvature 13 being such as to permit the beam to be bent to the desired shape without weakening the structure of the metal. A stop element 15 is welded or otherwise secured to the central web of the beam at a point approximately midway down the curved portion 13 in order to limit the movement of the chain hoist, as will be hereinafter described. The horizontal straight section 12 of the beam is provided with a plurality of bolt holes at its rear end in order to accommodate the bolts 21 and a plurality of bolt holes substantially midway along the I-beam to receive the bolts 22 whereby the beam is supported from the arch frame assembly described hereinafter. At the forward end of the beam the short vertical portion 14 is drilled on the forward web with a number of bolt holes to accommodate the bolts 24 whereby the track beam assembly is anchored to the front anchor assembly. Brackets are secured to the lower end of the beam to reinforce the anchor connection as hereinafter described.

The arch frame assembly comprises a transverse base channel 25 arranged with its flanges extending downwardly and provided with a wooden filler pad 26 which, when the device is installed, will rest on the floor surface of the truck body and cushion the contact of the metal base channel 25 with respect to the truck body. The supporting arch for the track beam assembly consists of two identical and opposite arched supporting beams 27 and 28, each of which is welded to the ends of the channel 25 as indicated at 29 and 31, respectively, and are provided with the angle braces 32 and 33 which is also welded between the supporting beams and the channel 25 to give additional rigidity to the structure. The upper ends of each of the supporting beams are curved inwardly to cooperate to form a substantially semi-circular arch, so that it may be positioned in a standard truck without interference with the bows 30 of the cargo body cover, and yet provide ample space below the beams for loading the truck.

Each of the beams is cut away at the points 34 to provide clearance on either side of the I-beam assembly 11 so that the chain hoist 36 may be rolled longitudinally along the I-beam 11 without interference from the beams 27 or 28. The upper extremities of the beams 27 and 28 are united by a relatively wide, thin gusset plate 37, serving to interconnect the outer flanges of each of the beams. A cooperating gusset plate 38 is welded to the inner flanges of each of the beams 27 and 28 and is shaped to follow the contour of the web of the beam and thus provide ample clearance for the chain hoist on either side of the beam 11. The gusset plates 37 and 38 are each securely welded to the beams 27 and 28 and are drilled with a plurality of bolt holes, positioned to register with the bolt holes in the upper flange of the section 12 of the I-beam assembly so that the bolts 22 may be easily slipped into place and tightened up in the field without any drilling or special machine work. Each of the arch supporting beams 27 and 28 is also provided with drilled openings to receive the bolts 39 by which the track beam brace assembly is to be secured.

The front anchor assembly of the device consists of a base channel 41 provided with a wooden filler pad 42 on its lower surface to cushion the contact of the metal with the surface of the vehicle body. A gusset plate 43 is welded to the channel 41 and is provided with a plurality of bolt holes arranged to register with the bolt holes in the anchor portion 14 of the I-beam assembly so that the bolts 24 may be easily slipped into place during the field assembly of the device. The channel 41 is also provided with bolt holes arranged to register with the bolt holes on the brackets 20 at the lower extremity of the section 14 of the track beam assembly in order to receive the bolts 44.

The channel 41 should be anchored to the floor surface of the truck body. For this purpose a plurality of bolt holes 45 are drilled at each end of the channel so that it may be secured to the body of the truck vehicle by lag screws or bolts.

The rear extremity of the track beam assembly is given additional support by a track brace assembly which also serves to provide a convenient hand grip to assist in loading heavy materials into the truck body. The track brace assembly includes a casting or forging 51 provided with a plurality of bolt holes arranged to register with the bolt holes at the extremity of the section 12 of the track beam and to receive the bolts 21. The forging 51 is integrally united with a header 52 united with the upper extremities of each of a pair of angle braces 53 and 54 which extend downwardly toward a midpoint on the arched supporting beams and which are provided with a pair of connecting flanges 55 and 56, respectively. Each of the flanges 55 and 56 is welded or otherwise integrally secured to the braces 53 and 54 and is provided with drilled bolt holes positioned to register with the bolt holes in the arched supporting beams and to be united therewith by the bolts 39 heretofore described.

In the assembly of the device in the field the track beam assembly is bolted to the arch frame assembly by the bolts 22. The forward end portion 14 of the beam is united with the anchor assembly by bolting the forward flange of the beam to the gusset plate 43 with the bolts 44.

The anchor connection is also reinforced by the bolts 24, by which the brackets 20 are secured to the channel 41. The chain hoist 36 is then rolled on to the lower flanges of the horizontal beam and the track brace assembly is bolted in place by the bolts 21 and 39.

It will be understood, of course, that the rearward movement of the chain hoist will be limited by the forging 51 which acts as a rear limiting stop for the hoist. The forward movement of the hoist will be limited by the stop element 15 on the curved section 13 of the track beam. It is to be particularly noted, however, that the stop element 15 is positioned at a point substantially below the horizontal level of the main portion of the track beam 12 so that when the chain hoist contacts the stop element 15 it will be prevented from accidental shifting rearwardly by its own weight. By this arrangement the weight of the hoist tends to maintain it in firm engagement with the stop 15, and it can be shifted only by exerting a positive force somewhat greater than the incidental forces of inertia due to the movements of the vehicle. This feature is considered to be a matter of some importance, since it provides a gravity means for locating the chain hoist and does not require any anchor chains or bolts which are bothersome in practice and unsatisfactory in operation, due to their inherent tendency to jam and prevent the hoist from being available when needed.

It should also be noted that the particular construction and arrangement of the arch frame assembly is such that the entire arch frame does not extend substantially above the horizontal portion 12 of the I-beam, with the result that the I-beam may be placed at its maximum elevation below the standard bows of a covered truck body. This is also regarded as a feature of importance, since it permits full use of the available space within the vehicle. In modern military circles it is regarded as highly undesirable to increase the height of the vehicle top, since to do so increases the silhouette of the vehicle and increases dangers incident to hostile observation in the field.

I have shown and described the present invention in the preferred form as developed for military purposes and adopted by the United States Army. I am aware, however, that it is subject to numerous alterations and modifications without departing from the invention spirit, and I therefore do not wish to be limited except as by the scope of the appended claims.

Having thus described my invention, what I claim as new and desire to secure by Letters Patent, is:

1. In combination, a motor vehicle including a cargo body having a floor, side walls, and a plurality of bows extending between said opposite side walls and arranged to support a flexible cover for said cargo body, a prefabricated sectional crane secured to the floor portion of the truck box and being of dimensions to be substantially enclosed by the cover bows and cover portion heretofore mentioned, said prefabricated sectional crane structure comprising an arched frame assembly located in transverse position adjacent the rear edge of the truck box and comprising a transverse base channel and a pair of arched supporting beams extending upwardly from the opposite ends of said base channel and curving inwardly toward each other, a pair of gusset plates joining said upper ends of said arched supporting beams, the gusset plates being arranged with their surfaces in contact with the opposite faces of the supporting beams at their marginal edges and being offset into face-to-face relationship with each other at their central section to provide a thin, wide bolting surface and cut away clearance on each side thereof; a track beam assembly comprising a single integral section of I-beam formed to include a relatively long, straight, horizontal top section, adapted to be bolted to the gusset plates hereinbefore described, and gradually downwardly inclined curved front section, including a stop portion located at a point substanitally below the level of the horizontal top section, and a vertical section extending downwardly from the curved front section to a point adjacent the floor of the truck box; and a front anchor assembly comprising a transverse channel adapted to be secured to the floor portion of the truck box and gusset plates secured to the transverse channel and secured to the track beam assembly.

2. In combination, a motor vehicle including a cargo body having a floor and side walls, a plurality of bows extending between said opposite side walls and arranged to support a flexible cover for said truck, a prefabricated sectional crant secured to the floor portion of the truck box and being of dimensions to be substantially enclosed by the bows and cover portion heretofore mentioned, said prefabricated sectional crane structure comprising an arched frame assembly located in transverse position adjacent the rear edge of the truck box and including a pair of supporting beams extending upwardly from the opposite sides of said cargo body and extending inwardly toward each other, a gusset plate joining said upper ends of said arched supporting beans and spacing the ends of the beams apart from each other, the gusset plate being arranged with its surface in contact with the supporting beams to provide a thin, wide bolting surface and clearance on each side thereof; a track beam assembly comprising a section of I-beam formed to include a relatively long, straight, horizontal top section, adapted to be bolted to the gusset plate hereinbefore described, a front section extending downwardly to a point adjacent the floor of the car body, and anchor means adapted to be secured to the floor portion of the truck box.

3. In combination, a motor vehicle including a cargo body having a floor, side walls, and a plurality of bows extending between said opposite side walls and arranged to support a flexible cover for said cargo body, a prefabricated sectional crane secured to the floor portion of the truck box and being of dimensions to be substantially enclosed by the cover bows heretofore mentioned, said prefabricated sectional crane structure comprising an arched frame assembly located in transverse position adjacent the rear edge of the truck box and comprising a transverse base channel and a pair of arched supporting beams extending upwardly from the opposite ends of said base channel and curving inwardly toward each other, a pair of gusset plates joining said upper ends of said arched supporting beams, the gusset plates being arranged with their surfaces in contact with the opposite faces of the supporting beams at their marginal edges and being offset into face-to-face relationship with each other at their central section to provide a thin, wide bolting surface and cut away clearance on each side thereof; a track beam assembly comprising a single integral section of I-beam formed to include a relatively long, straight, horizontal top section, adapted to be bolted to the gusset plates hereinbefore described, and gradually downwardly inclined curved front section, including a stop portion located at a point substantially below the level of the horizontal top section, and a vertical section extending downwardly from the curved front section to a point adjacent the floor of the truck box; a front anchor assembly comprising a transverse channel adapted to be secured to the floor portion of the truck box and gusset plates secured to the transverse channel and adapted to be removably bolted to the track beam assembly; and a track brace assembly comprising a bolting member adapted to be removably bolted to the extreme rear portion of the track beam assembly to interconnect said track beam assembly with a pair of tubular angular braces extending downwardly and forwardly to the arch frame and provided with mounting flanges whereby the lower extremities of said tubular angular braces may be removably bolted to the arched supporting beams of the arched frame.

4. In a crane, a frame assembly, a track beam assembly, and a chain hoist, the said frame assembly being arranged to support the track beam, the entire structure being characterized by the particular configuration of the track beam wherein the track beam is arranged to support the chain hoist for longitudinal movement and is provided with a long straight horizontal track beam, said beam including a downwardly inclined portion below the horizontal level of the main track beam whereby said downwardly inclined portion of the beam will constitute a gravity pocket for securing the chain hoisting in predetermined position.

5. As an article of manufacture, a prefabricated sectional crane adapted to be removably installed on the floor surface of a standard motor vehicle truck body to convert a general purpose truck into a wrecking vehicle, said prefabricated sectional crane structure including a frame assembly, a track beam, and a chain hoist, said track beam assembly comprising a single integral I-beam secured to the arch frame assembly and including a long straight horizontal track portion extending rearwardly therefrom beyond the rear edge of the motor vehicle truck box and extending forwardly therefrom to a point adjacent the forward end of the vehicle truck box and secured to the front anchor assembly at the forward end, the entire structure being characterized by the particular configuration of the track beam wherein the track beam is arranged to support the chain hoist for longitudinal movement from a position at the extreme rear end of the beam assembly to a position adjacent the forward end of said beam, the forward end portion of said beam being provided with a downwardly inclined portion whereby said downwardly inclined portion integral with the beam and below the plane of the horizontal track portion of the beam will constitute a gravity pocket for securing the chain hoisting in predetermined inoperative position.

6. As an article of manufacture, a prefabricated sectional crane adapted to be removably installed on the floor surface of a standard motor vehicle truck body to convert a general purpose truck into a wrecking vehicle, said prefabricated sectional crane structure including an arch frame assembly, a track beam assembly, a front anchor assembly, a track brace assembly, and a chain hoist, the arch frame assembly comprising a transverse base channel, a pair of arched supporting beams, and a plurality of gusset plates, whereby the arched frame assembly may be utilized to support the track beam assembly, and a track beam assembly comprising a single integral I-beam secured to the arch frame assembly and including a long straight horizontal track portion extending rearwardly therefrom beyond the rear edge of the motor vehicle truck box and extending forwardly therefrom to a point adjacent the forward end of the vehicle truck box and secured to the front anchor assembly at the forward end, the entire structure being characterized by the particular configuration of the track beam wherein the track beam is arranged to support the chain hoist for longitudinal movement from a position at the extreme rear end of the beam assembly to a position adjacent the forward end of said beam, the forward end portion of said beam being provided with a downwardly inclined portion substantially below the horizontal level of the main track beam whereby said downwardly inclined portion of the beam will constitute a gravity pocket for securing the chain hoisting in predetermined inoperative position below the level of the horizontal track beam.

7. As an article of manufacture, a prefabricated sectional crane adapted to be removably installed in a standard motor vehicle truck body to convert a standard all-purpose truck body into a wrecking vehicle, said prefabricated crane including an arch frame assembly, a track beam assembly, a front anchor assembly, a track brace assembly, and chain hoist, the arch frame assembly comprising a transverse base channel adapted to be secured to the floor surface of a vehicle truck body, a pair of arched supporting beams extending vertically from the opposite ends of said base channel and curving inwardly adjacent their upper ends, a pair of gusset plates, one of said gusset plates being integrally united with the upper surfaces of said arched supporting beams, cut away portions of the lower surfaces of said arched supporting beams to provide clearance on either side of the gusset plate, a second gusset plate formed to conform to the profile of the cut away beams and secured to the lower surfaces of said beams and to the lower face of the first-mentioned gusset plates; a track beam assembly comprising a single integral I-beam formed to include a relatively long straight horizontal top section, a downwardly curved forward section including a limit stop at a position intermediate the ends of said curve, and a vertical front section extending downwardly from the lower end of the curved section to the front anchor assembly; said front anchor assembly including a transverse channel adapted to be secured to the lower surface of a vehicle truck box body and including gusset plates adapted to be removably bolted to the vertical front section of the track beam assembly; a chain hoist including rollers and mounted for longitudinal rolling movement along the track beam assembly, and a track brace assembly including a pair of angular braces adapted to extend between the rear extremity of the track beam and the arch frame assembly.

8. As an article of manufacture, a prefabricated sectional crane adapted to be removably installed in a standard motor vehicle truck body to convert a standard all-purpose truck body into a wrecking vehicle, said prefabricated crane including an arch frame assembly, a track beam assembly, a front anchor assembly, and chain hoist, the arch frame assembly comprising a transverse base channel adapted to be secured to the floor surface of a vehicle truck body, a pair of arched supporting beams extending vertically from the opposite ends of said base channel and curving inwardly adjacent their upper ends, a pair of gusset plates, one of said gusset plates being integrally united with the upper surfaces of said arched supporting beams, cut away portions of the lower surfaces of said arched supporting beams to provide clearance on either side of the gusset plate, a second gusset plate formed to conform to the profile of the cut away beams and secured to the lower surfaces of said beams and to the lower face of the first-mentioned gusset plates, a track beam assembly comprising a single integral I-beam formed to include a relatively long straight horizontal top section, a downwardly curved forward section including a limit stop at a position intermediate the ends of said curve and a vertical front section extending downwardly from the lower end of the curved section to the front anchor assembly, said front anchor assembly including a transverse channel adapted to be secured to the lower surface of a vehicle truck box body and including gusset plates adapted to be removably bolted to the vertical front section of the track beam assembly, and a chain hoist including rollers and mounted for longitudinal rolling movement along the track beam assembly.

9. As an article of manufacture, a prefabricated sectional crane adapted to be removably installed in a standard motor vehicle truck body to convert a standard all-purpose truck body into a wrecking vehicle, said prefabricated crane including an arch frame assembly, a track beam assembly, and chain hoist, the arch frame assembly including a pair of arched supporting beams extending vertically from the opposite sides of the vehicle body and curving inwardly adjacent their upper ends, a pair of gusset plates, one of said gusset plates being integrally united with the upper surfaces of said arched supporting beams, cut away portions of the lower surfaces of said arched supporting beams to provide clearance on either side of the track beam, a second gusset plate formed to conform to the profile of the cut away beams and secured to the lower surfaces of said beams and to the lower face of the first-mentioned gusset plates, a track beam removably bolted to the gusset plates, and a chain hoist including rollers and mounted for longitudinal rolling movement along the track beam assembly.

10. As an article of manufacture, a prefabricated sectional crane adapted to be removably installed in a standard motor vehicle truck body to convert a standard all-purpose truck body into a wrecking vehicle, said prefabricated crane including an arch frame assembly, a track beam assembly, a front anchor assembly, and chain hoist, said track beam assembly comprising a single integral I-beam formed to include a relatively long straight horizontal top section, a downwardly curved forward section and a vertical front section extending downwardly from the lower end of the curved section to the front anchor assembly; said front anchor assembly including a transverse channel adapted to be secured to the lower surface of a vehicle truck box body and including gusset plates adapted to be removably bolted to the vertical front section of the track beam assembly; and a chain hoist including rollers and mounted for longitudinal rolling movement along the track beam assembly.

WILLIAM B. JOHNSON.